US007000292B2

(12) United States Patent
Beaudoin et al.

(10) Patent No.: US 7,000,292 B2
(45) Date of Patent: Feb. 21, 2006

(54) CHAIN KEEPER AND METHOD OF RETAINING A CHAIN

(75) Inventors: Richard Beaudoin, Drummondville (CA); Peter Dow, Grande-Cascapedia (CA); Richard Tremblay, Drummondville (CA)

(73) Assignee: Canimex Inc., Quebec (CA)

( * ) Notice: Subject to any disclaimer, the term of this patent is extended or adjusted under 35 U.S.C. 154(b) by 22 days.

(21) Appl. No.: 10/391,102

(22) Filed: Mar. 17, 2003

(65) Prior Publication Data

US 2004/0103505 A1 Jun. 3, 2004

Related U.S. Application Data

(60) Provisional application No. 60/364,101, filed on Mar. 15, 2002.

(51) Int. Cl.
*F16G 15/00* (2006.01)

(52) U.S. Cl. ...................... 24/116 R; 24/116 A; 59/93; 294/82.1; 70/49; 70/53

(58) Field of Classification Search .................. 24/512, 24/133, 134 P, 116 R, 130, 136 L, 122.6, 24/115 M, 299, 370, 116 A; 59/78, 93; 294/82.1; 292/264, 292; 114/218; 410/96
See application file for complete search history.

(56) References Cited

U.S. PATENT DOCUMENTS

| | | | | |
|---|---|---|---|---|
| 521,045 A | | 6/1894 | Rohrbach | |
| 1,221,954 A | | 4/1917 | Arnold | |
| D52,662 S | | 11/1918 | Knuckey | |
| 1,325,538 A | | 12/1919 | Smith | |
| 1,496,793 A | | 6/1924 | Unger | |
| 2,025,377 A | | 12/1935 | Crannell | 292/264 |
| 2,184,814 A | | 12/1939 | Nagamatsu | 24/116 R |
| 2,448,482 A | | 8/1948 | Woolslayer et al. | 24/116 R |
| 2,790,663 A | | 4/1957 | Sarver | 292/264 |
| 2,859,937 A | | 11/1958 | Robins et al. | 254/167 |
| 2,860,903 A | | 11/1958 | Narancich et al. | 292/48 |
| 2,873,499 A | * | 2/1959 | Bartholomew | 114/218 |
| 3,126,858 A | * | 3/1964 | Rosinski | 114/218 |
| 3,715,782 A | | 2/1973 | Newell | 24/116 |
| 3,720,431 A | | 3/1973 | Oliver et al. | 292/264 |
| 3,859,947 A | * | 1/1975 | Vavolotis | 114/218 |
| D241,506 S | | 9/1976 | Condos | D8/137 |
| D241,507 S | | 9/1976 | Condos | D8/137 |
| 4,043,538 A | | 8/1977 | Schreyer | 254/168 |
| 4,151,708 A | * | 5/1979 | Smetz | 59/93 |
| 4,398,387 A | | 8/1983 | Bary | 59/93 |
| 4,560,191 A | | 12/1985 | Grassi | 292/264 |
| 4,883,191 A | | 11/1989 | Christensen | 220/83 |
| 4,923,231 A | | 5/1990 | Bergman et al. | 292/238 |

(Continued)

*Primary Examiner*—Jack Lavinder
(74) *Attorney, Agent, or Firm*—Merchant & Gould P.C.

(57) ABSTRACT

A chain keeper for retaining a chain operatively connected to a driving mechanism of a chain hoist system. The chain keeper has a support bracket and a pair of plates. The support bracket is mountable onto a fixed structure, and has a substantially vertical longitudinal axis, and opposite top and bottom sections. Each plate has top and bottom portions. The plates project from the support bracket and are slanted with respect to the longitudinal axis thereof. The plates converge towards one another towards the bottom section of the support bracket, a slot being defined between peripheral edges of the plates at the bottom section of the support bracket. The slot is shaped and sized to slidably and removably receive therein a segment of the chain for retaining the same from substantial vertical movement along the longitudinal axis of the support bracket.

14 Claims, 10 Drawing Sheets

U.S. PATENT DOCUMENTS

| | | | | | |
|---|---|---|---|---|---|
| 5,697,741 | A | | 12/1997 | Harris et al. | 410/116 |
| 5,704,663 | A | | 1/1998 | Clay, Jr. | 292/198 |
| 5,724,804 | A | * | 3/1998 | Smetz | 59/93 |
| 5,920,962 | A | | 7/1999 | Franklin | 24/116 R |
| 6,009,824 | A | | 1/2000 | Ross | 114/218 |
| 2002/0112463 | A1 | | 8/2002 | Smetz | 59/93 |

* cited by examiner

CHAIN KEEPER AND METHOD OF RETAINING A CHAIN

FIELD OF THE INVENTION

The present invention relates to a chain keeper. More particularly, the present invention relates to a chain keeper for use with a chain of a chain hoist system, such as the ones used with garage doors and the like for example. The present invention also relates to a method of retaining such a chain.

BACKGROUND OF THE INVENTION

Chain keepers for use with chain hoist systems of garage doors and the like have existed for many years now and are very well known in the art. Indeed, it is well known in the art that chain keepers typically consist of a slitted metallic plate with a corresponding groove into which the chain or "hand chain" of the chain hoist system is inserted for preventing travel of the chain so as to immobilize the latter, and thus immobilize the driving action of the chain hoist system. Typical examples of prior art chain keepers are described in U.S. Pat. Design Nos. 241,506 and 241,507.

It is also known in the art that manufacturers and designers have never really taken the time to think about different components, functions and/or features which could be added to the conventional chain keeper in order to improve the peformance.

Known in the art are the following US patents which describe various apparatuses and methods for use with chains U.S. Pat. Nos. 521,045; 1,221,954; 1,325,538; 1,496,793; 2,025,377; 2,184,814; 2,448,482; 2,790,663; 2,859,937; 2,860,903; 3,715,782; 3,720,431; 4,043,538; 4,398,387; 4,560,191; 4,883,191; 4,923,231; 5,697,741; 5,704,663; 5,920,962; 6,009,824; 2002/0112463 A1; Des. 52,662.

None of the above-mentioned patents seem to describe a chain keeper for retaining a chain operatively connected to a driving mechanism of a chain hoist system, such as the ones used with garage doors and the like for example, which would be devised so as to wind the chain around the keeper; which would be capable of retaining a single or a plurality of chains, and securing the same by means of a padlock; which would comprise means for safekeeping a padlock when the latter is not being used with the chain keeper; which would be devised to substantially prevent rotation thereof once it is mounted onto a fixed structure; which would be devised to guide the insertion of the chain used therewith and would be designed so as to offer an added resistance.

Hence, in light of the aforementioned, there is a need for an improved chain keeper for use a chain hoist system which would be able to overcome some of the above-mentioned problems.

SUMMARY OF THE INVENTION

The object of the present invention is to provide a chain keeper for use with a chain hoist system which, by virtue of its design and components, satisfies some of the above-mentioned needs and which is thus an improvement over other chain keepers known in the prior art.

In accordance with the present invention, the above object is achieved with a chain keeper for retaining a chain operatively connected to a driving mechanism of a chain hoist system, the chain keeper comprising:

a support bracket mountable onto a fixed structure, said support bracket having a substantially vertical longitudinal axis, and opposite top and bottom sections; and a pair of plates, each plate having top and bottom portions, the plates projecting from the support bracket and being slanted with respect to the longitudinal axis thereof, the plates converging towards one another towards the bottom section of the support bracket, a slot being defined between peripheral edges of the plates at said bottom section of the support bracket, said slot being shaped and sized to slidably and removably receive therein a segment of the chain for retaining the same from substantial vertical movement along the longitudinal axis of the support bracket.

Preferably, the bottom portion of one of said plates comprises a hole for receiving a rod of a padlock.

Preferably, the top portion of one of said plates comprises a hole for receiving a rod of a padlock.

Preferably, the top portion of one of said plates comprises a hook for hooking thereon a link of the chain.

Preferably also, the top portion of one of said plates is provided with a support flange comprising a hole for receiving a rod of a padlock.

Preferably also, the support bracket has left and right top corners, each of said top corners being provided with a prong for anchoring the support bracket onto the fixed structure.

Preferably also, the support bracket comprises at least one hole for receiving a fastener for securely mounting the support bracket onto the fixed structure, and the bottom section of the support bracket is provided with a fastening flange comprising at least one hole for receiving a fastener for securely mounting said fastening flange onto the fixed structure.

Preferably also, the support bracket is triangular-shaped and has a pair of side edges, and each plate extends along one of said side edges.

According to another aspect of the invention, there is also provided a method of retaining a chain operatively connected to a driving mechanism of a chain hoist system, the method comprising the steps of:

a) providing a chain keeper, said chain keeper comprising:

a support bracket mounted onto a fixed structure, said support bracket having a substantially vertical longitudinal axis, and opposite top and bottom sections; and a pair of plates, each plate having top and bottom portions, the plates projecting from the support bracket and being slanted with respect to the longitudinal axis thereof, the plates converging towards one another towards the bottom section of the support bracket, a slot being defined between peripheral edges of the plates at said bottom section of the support bracket, said slot being shaped and sized to slidably and removably receive therein a segment of the chain for retaining the same from substantial vertical movement along the longitudinal axis of the support bracket; and b) sliding said segment of the chain into the slot defined between the peripheral edges of the plates so as to retain the same from substantial vertical movement along the longitudinal axis of the support bracket.

Preferably, the chain comprises a portion hanging from the slot of the chain keeper, and the method further comprises the step of:

c) engaging said portion of the chain about one of the plates of the chain keeper.

Preferably also, one of the plates of the chain keeper comprises a hook, and the method further comprises the step of:

d) hooking a link of the portion of the chain wrapped about one of the plates onto said hook.

Preferably also, the bottom portion of one of said plates comprises a hole for receiving a rod of a padlock, and the method further comprises the step of:

e) securing said rod of the padlock onto the hole so as to prevent the segment of the chain to be removed from the slot due to an impediment of the rod secured onto said hole.

Alternatively, the bottom portion of one of said plates may comprise a hole for receiving a rod of a padlock, and the method after the above-mentioned step b) may simply comprise the step of:

c) securing said rod of the padlock onto the hole so as to prevent the segment of the chain to be removed from the slot due to an impediment of the rod secured onto said hole.

The objects, advantages and other features of the present invention will become more apparent upon reading of the following non-restrictive description of preferred embodiments thereof, given for the purpose of exemplification only with reference to the accompanying drawings.

DETAILED DESCRIPTION OF PREFERRED EMBODIMENTS OF THE INVENTION

In the following description, the same numerical references refer to similar elements. The embodiments shown in the accompanying drawings are preferred.

Moreover, although the present invention was primarily designed for use with a chain of a chain hoist system of a garage door, and more particularly with a manually operated chain hoist system of a garage door, it may be used with other types of linkages (e.g. ropes), and chain hoist systems, or devices having a linkage operatively connected to their driving mechanism, as apparent to a person skilled in the art. For this reason, the expressions “chain”, “hoist” and/or “door”, as well as any other equivalent expressions and/or compound words thereof, should not be taken as to limit the scope of the present invention and include all other kinds of items and purposes with which the present invention may be used and could be useful.

Moreover, in the context of the present invention, the expressions “garage” and “door” may be used interchangeably. Furthermore, expressions such as “chain”, “hoist”, and “system” as well as any other equivalent expressions and/or compound words thereof, may also be used interchangeably in the context of the present description. The same applies for any other mutually equivalent expressions, such as “chain” and “rope” for example, as apparent to a person skilled in the art.

In addition, although the preferred embodiment of the present invention as illustrated in the accompanying drawings comprises various components such as support flanges, a fastening flange, holes, prongs, rounded corners, etc., and although the preferred embodiment of the chain keeper and corresponding parts of the present invention as shown consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the chain keeper according to the present invention, as will be briefly explained hereinafter, without departing from the scope of the invention.

Figure 7:
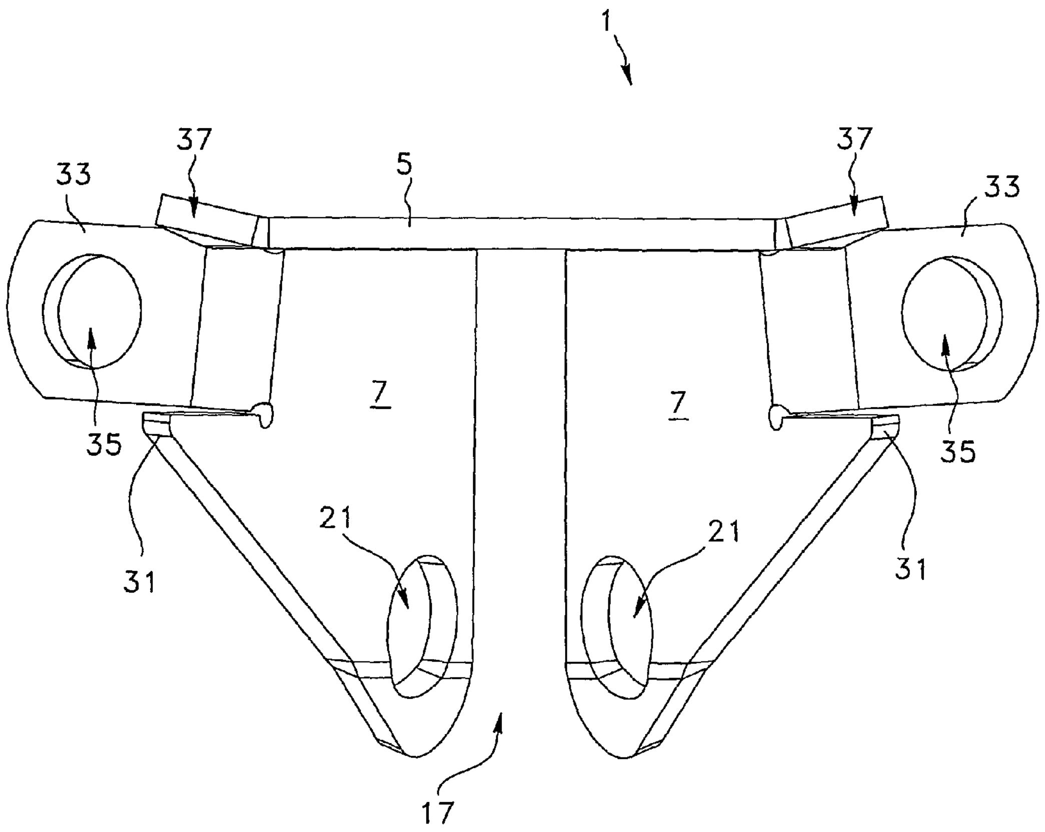
FIG. 7 is a top plan view of the chain keeper shown in FIG. 4.

Broadly described, the chain keeper 1 according to the present invention, as exemplified in the accompanying drawings, is a chain keeper 1 for retaining a chain 3 operatively connected to a driving mechanism of a chain hoist system, for example, and comprises a support bracket 5 and a pair of plates 7. The support bracket 5 is mountable onto a fixed structure 9 and has a substantially vertical longitudinal axis 11, and opposite top and bottom sections, as better shown in FIG. 5. As better illustrated in FIGS. 1–2 and 4–7, each plate 7 of the chain keeper 1 has top and bottom portions 13, 15, and the plates 7 project from the support bracket 5 and are slanted with respect to the longitudinal axis thereof. As shown, the plates 7 converge towards one another towards the bottom section of the support bracket 5 and a slot 17 is defined between peripheral edges 19 of the plates 7 at said bottom section of the support bracket 5, as better shown in FIGS. 4 and 7. The slot 17 is shaped and sized to slidably and removably receive therein a segment of the chain 3, as can be easily understood when referring to FIGS. 3, 8 and 9, for retaining said segment of the chain 3 from substantial vertical movement along the longitudinal axis 11 of the support bracket 5, due to an abutment with the peripheral edges 19 of the plates 7, and thus maintain the driving mechanism of the chain hoist system in a stable or “immobilized” configuration, as apparent to a person skilled in the art.

Figure 3:
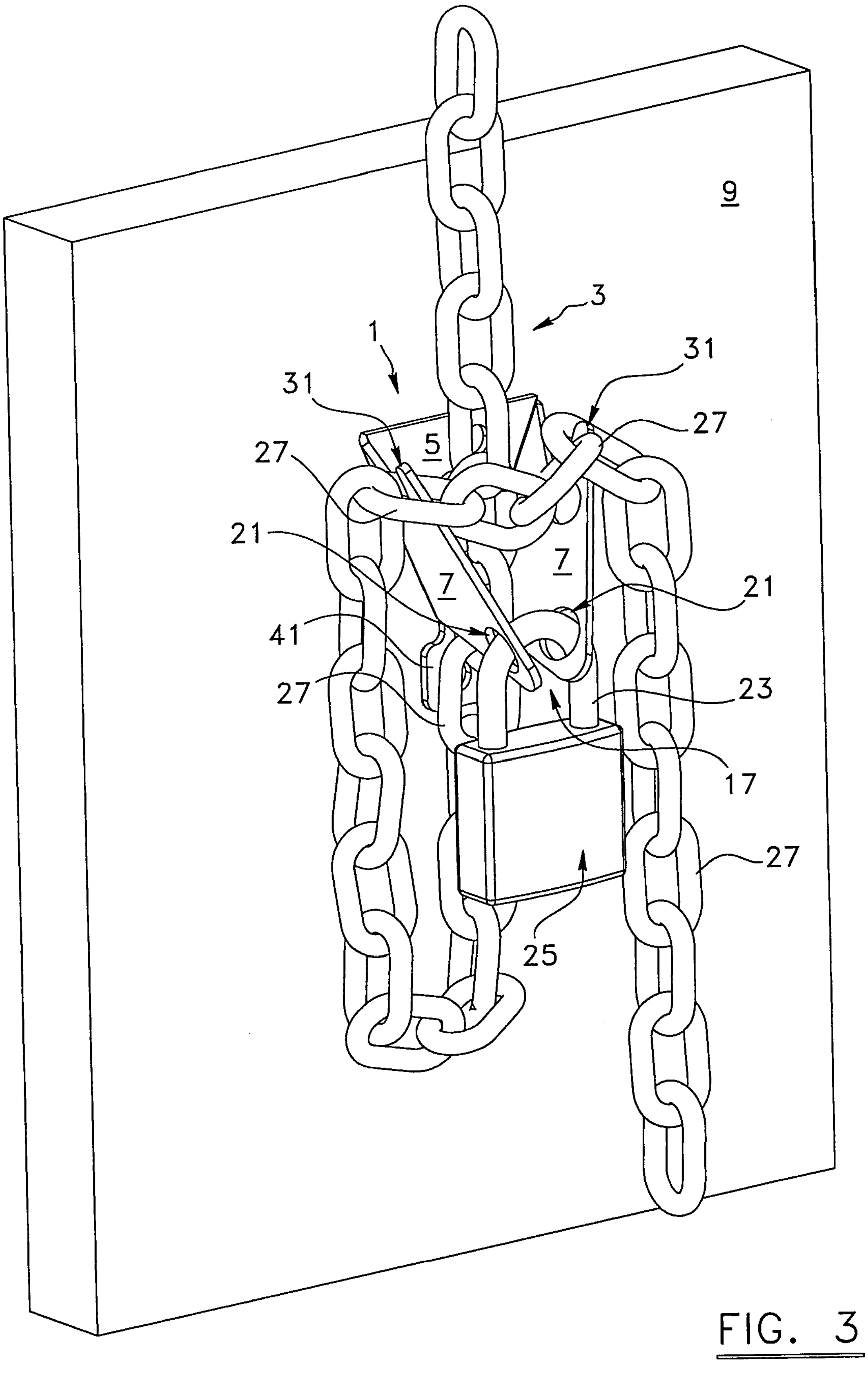
FIG. 3 is a perspective view of the chain keeper shown in FIG. 1, the chain keeper being shown mounted onto a fixed structure and cooperating with a padlock and a chain of a chain hoist system, the padlock being shown in a locked configuration and hooked onto the holes of the bottom portion of the plates.
Figure 8:
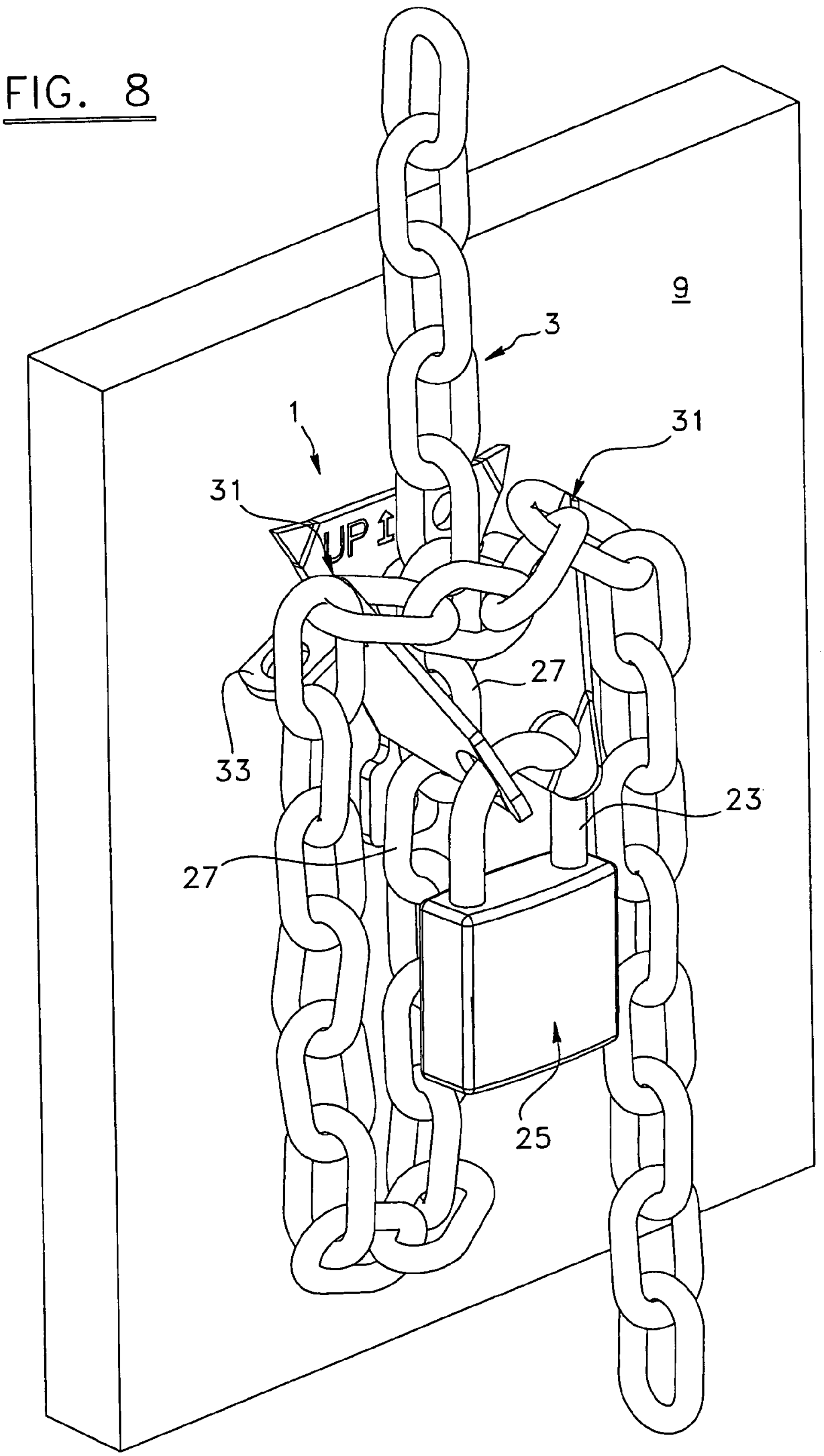
FIG. 8 is a perspective view of the chain keeper shown in FIG. 4, the chain keeper being shown mounted onto a fixed structure and cooperating with a padlock and a chain of the chain hoist system, the padlock being shown in a locked configuration and hooked onto the holes of the bottom portion of the plates.
Figure 9:
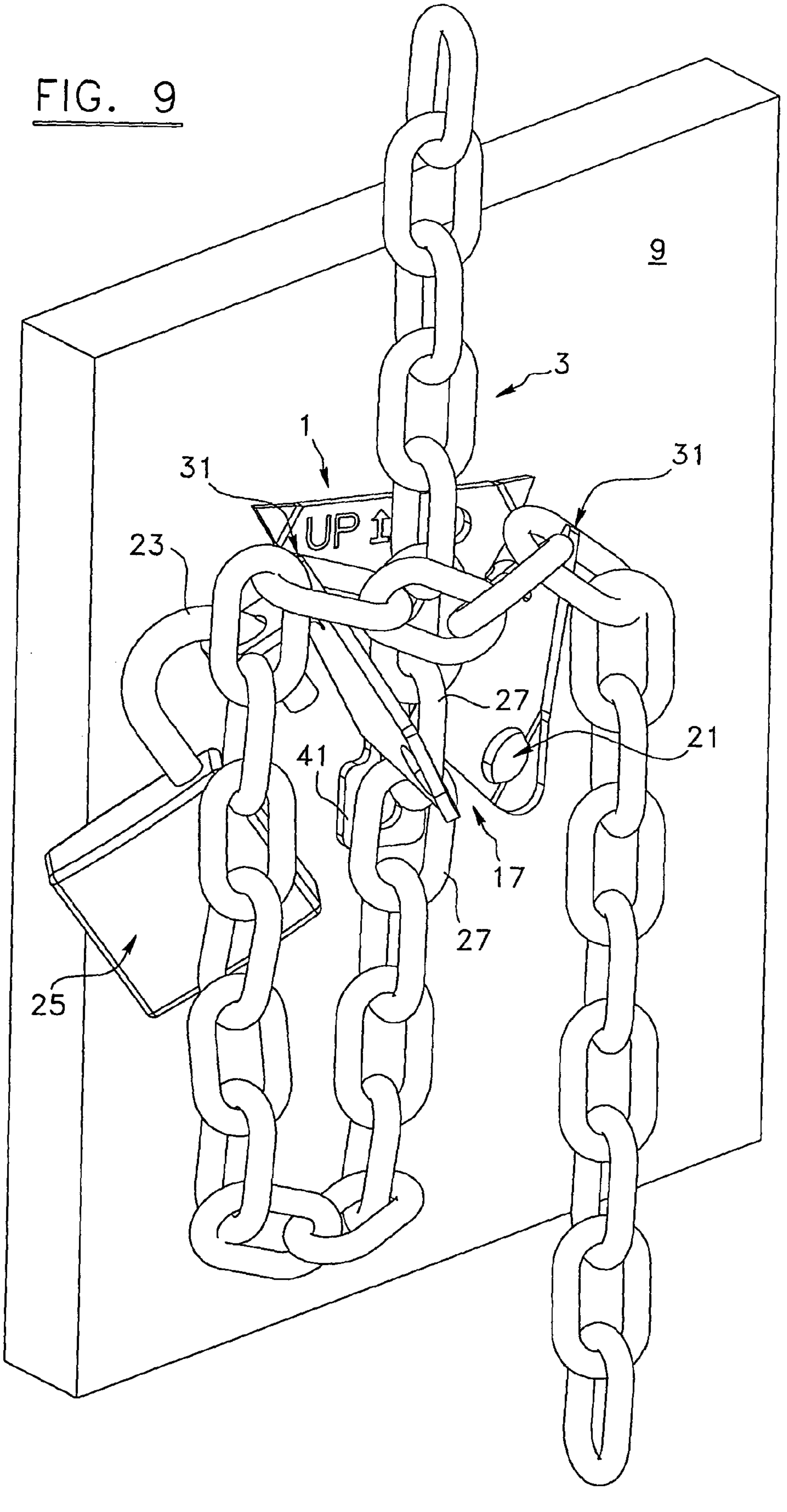
FIG. 9 is a perspective view of the chain keeper shown in FIG. 4, the chain keeper being shown mounted onto a fixed structure and cooperating with a padlock and a chain of the chain hoist system, the padlock being shown in an unlocked and unused configuration and hooked onto a support flange of the chain keeper.

According to the preferred embodiments of the invention, and as shown in FIGS. 3, 8 and 9, the slot 17 is preferably shaped and sized (or alternatively, the chain 3 is preferably shaped and sized) so that when a segment of the chain 3 is inserted into the slot 17, a link 27 of the chain is positioned above the slot 17, in the converging area of the plates 7, in a substantially parallel manner with respect to the slot 17; whereas, a neighboring link 27 to the above-mentioned is positioned below the slot 17, in a substantially transverse manner with respect to the slot 17, so as to be in abutment with the peripheral edges 19 of the plates 7, so as to thus prevent the chain 3 from substantial vertical movement along the longitudinal axis 11 of the chain keeper 1, as apparent to a person skilled in the art. It is worth mentioning that the peripheral edges 19 of the plates 7 and the nature of the linkage (e.g. chain 3) may be altered according to the present invention so as to ensure a proper retaining and abutment thereinbetween, as also apparent to a person skilled in the art.

Figure 1:
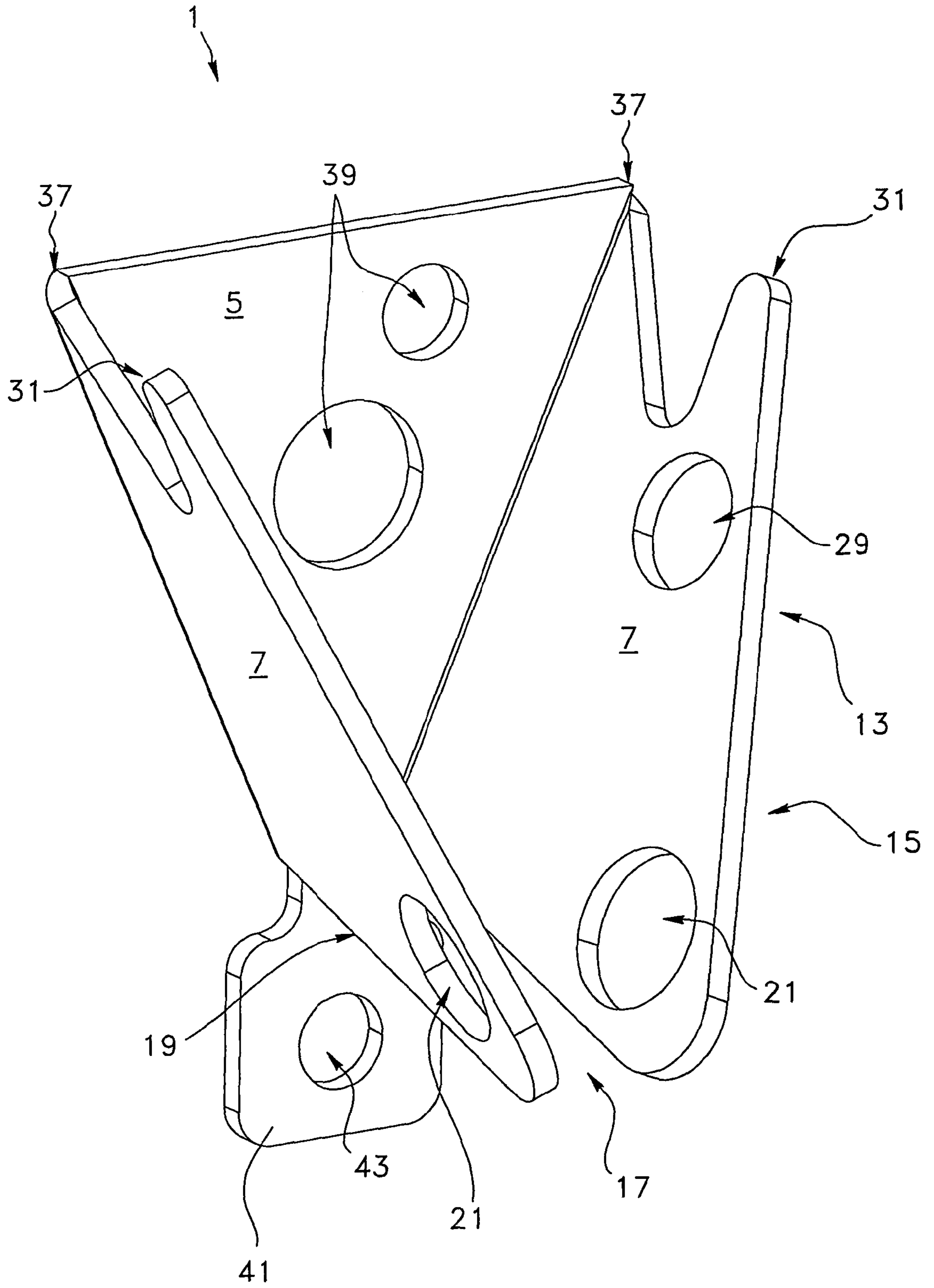
FIG. 1 is a perspective view of a chain keeper according to a first preferred embodiment of the invention.
Figure 2:
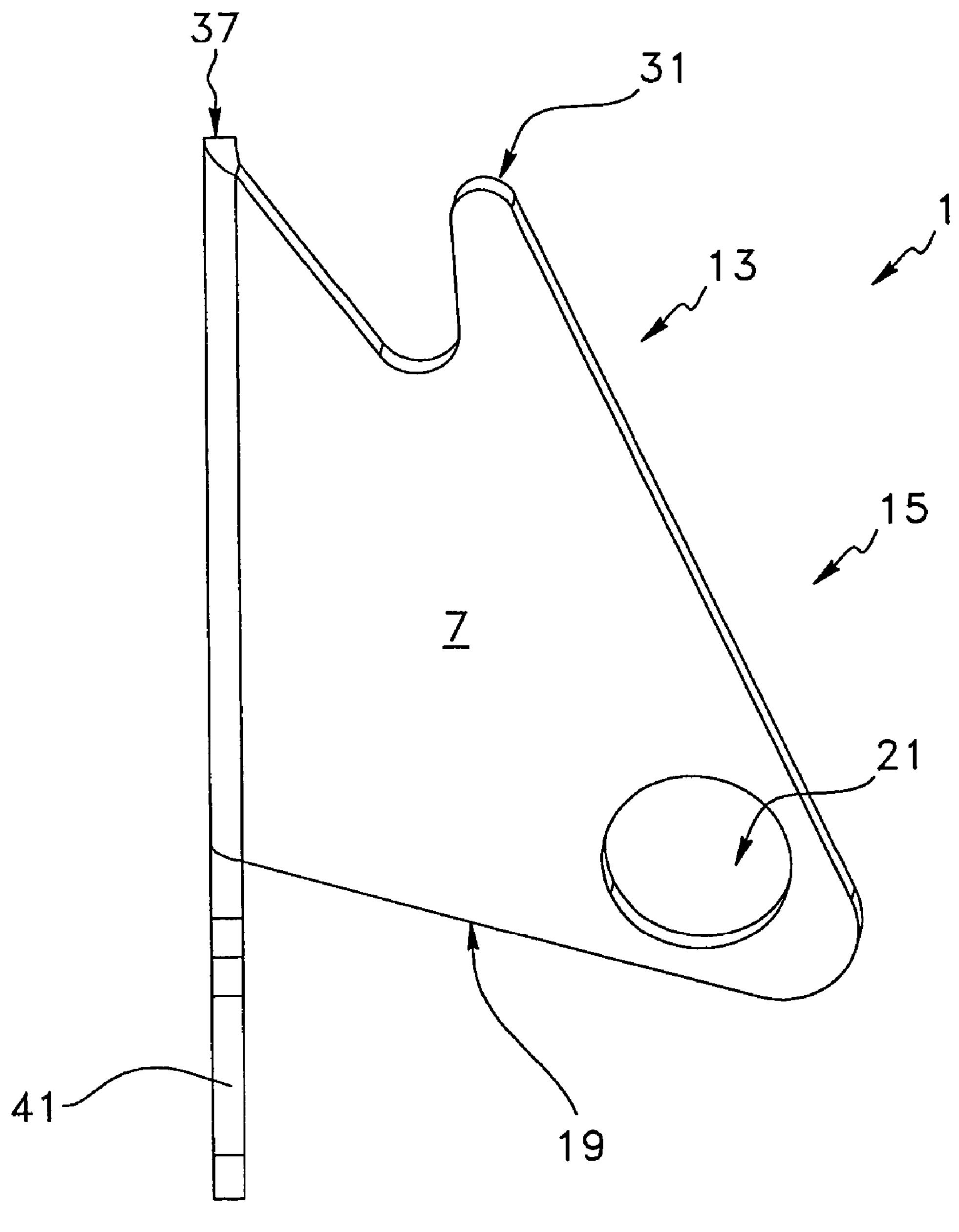
FIG. 2 is a side elevational view of the chain keeper shown in FIG. 1.
Figure 4:
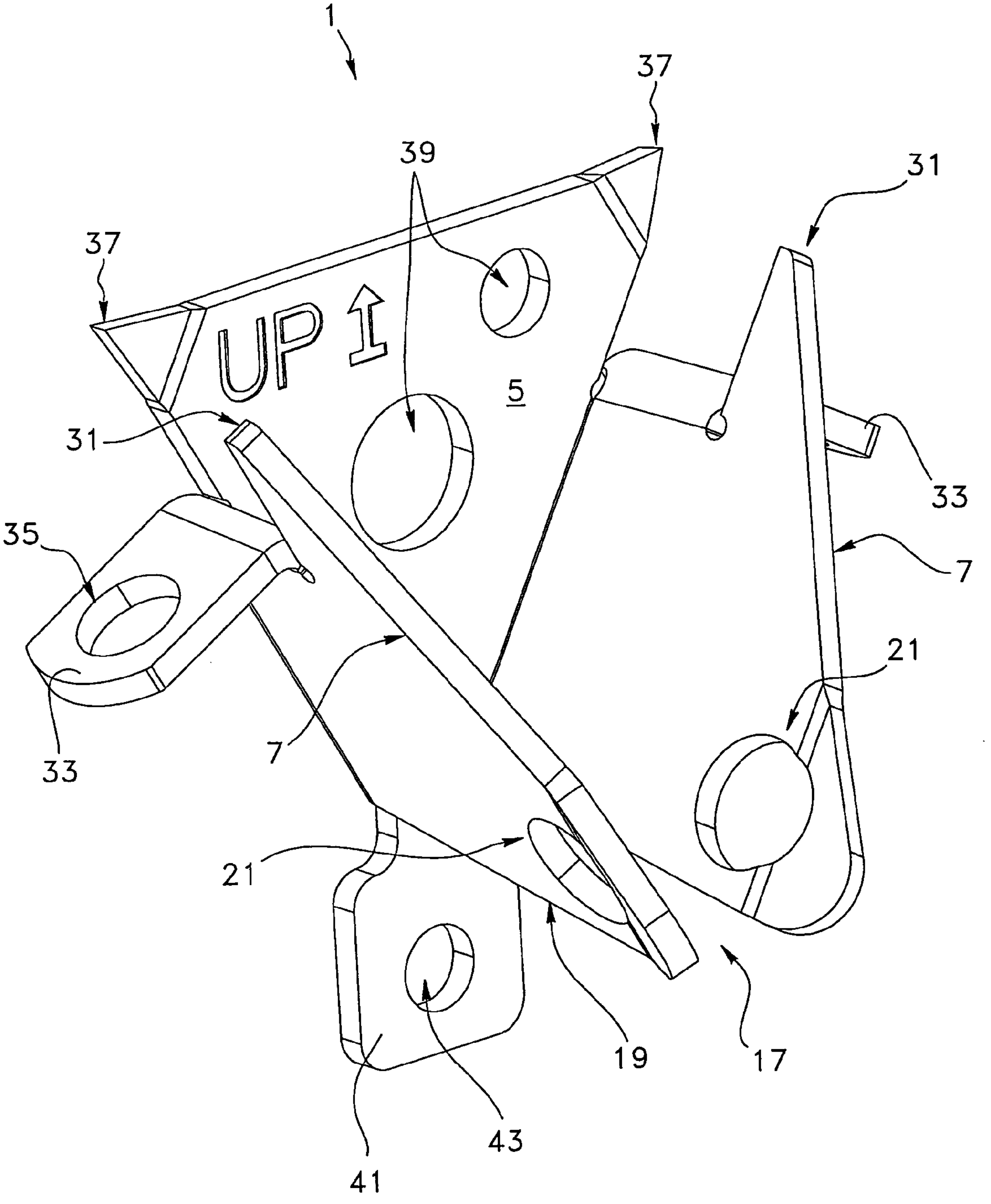
FIG. 4 is a perspective view of a chain keeper according to a second preferred embodiment of the invention.

As better shown in FIGS. 1 and 4, the bottom portion 15 of one of the plates 7 of the chain keeper 1 preferably comprises a hole 21 for receiving a rod of a padlock. Preferably, the bottom portion of each plate 7 comprises such a hole 21 for receiving a rod 23 of a padlock 25, the holes 21 of the bottom portion 15 of the plates 7 being shaped, sized, and positioned so as to prevent the segment of the chain 3 inserted into the slot 17 from being removed therefrom when the rod 23 of the padlock 25, or any suitable hooking device acting as an impediment, is inserted and hooked onto the holes 21. For added securement of the chain 3, the padlock 25 may be locked so as to prevent an unwanted user from removing the padlock 25 from the keeper 1 and thus being able to remove the chain 3 from the slot 17 of the keeper 1, as better shown in FIGS. 3 and 8. Alternatively, and although not a preferred intended use, the chain 3 may be secured to the keeper 1 by inserting the rod 23 of the padlock 25 through a corresponding link 27 of the chain 3 and through one or both of the bottom holes 21 of the keeper 1.

According to the first preferred embodiment of the invention, as better shown in FIG. 1, the top portion 13 of one of the plates 7 comprises a hole 29 for receiving a rod 23 of a padlock 25. As can be easily understood, only one of the plates 7 may be provided with such a hole 29 for receiving the rod 23 of the padlock 25, but alternatively, the top portion 13 of each plate 7 may comprise such a hole 29. The hole 29 is preferably intended, among other reasons, for hooking thereon the padlock 25 when it is not being used to secure the chain 3 onto the keeper 1, so as to prevent the padlock 25 from becoming lost, and also enabling it to be readily available to a user of the chain keeper 1 should said user wish to secure the chain 3 onto the keeper 1 with the padlock 25. Thus, the top hole(s) 29 of the chain keeper 1 may act as safekeeping means for the padlock 25 when the latter is not being used.

According to the present invention, as better shown in FIGS. 1–6, the top portion of one of the plates 7 preferably comprises a hook 31 for hooking thereon a link 27 of the chain 3. Preferably also, each plate 7 of the keeper 1 comprises a hook 31 for hooking thereon a corresponding link 27 of the chain 3. These hooks 31 are preferably intended, among other reasons, for maintaining engagement of the chain 3 about the plates 7 of the keeper 1, and for providing added securement of the chain 3 onto the chain keeper 1 should the chain 3 be pulled upwards by the chain hoist system. The hooks 31 preferably comprise soft rounded tips for preventing injuries to users interacting therewith.

According to the second preferred embodiment of the present invention, as better shown in FIGS. 4–7, the top portion 13 of one of the plates 7 is preferably provided with a support flange 33, and more particularly, the top portion 13 of each plate 7 is preferably provided with a support flange 33, each of said support flanges 33 preferably comprising a hole 35 for receiving a rod 23 of the padlock 25. The support flanges 33 are preferably intended, among other reasons, for facilitating wrapping of the chain 3 about the plates 7 of the keeper 1 but are also primarily intended for supporting a padlock 25 when it is not being used, so as to prevent the latter from becoming lost and enabling the padlock 25 to be readily available to a user of the chain keeper. The rod 23 of the padlock 25 may be hooked onto the hole 35 of a corresponding support flange 33. Although a single support flange 33 may suffice for safekeeping the padlock 25, the chain keeper 1 preferably comprises left and right support flanges 33 for storing the padlock 25 on either side, according to the particular preferences of the user of the chain keeper 1.

Figure 5:
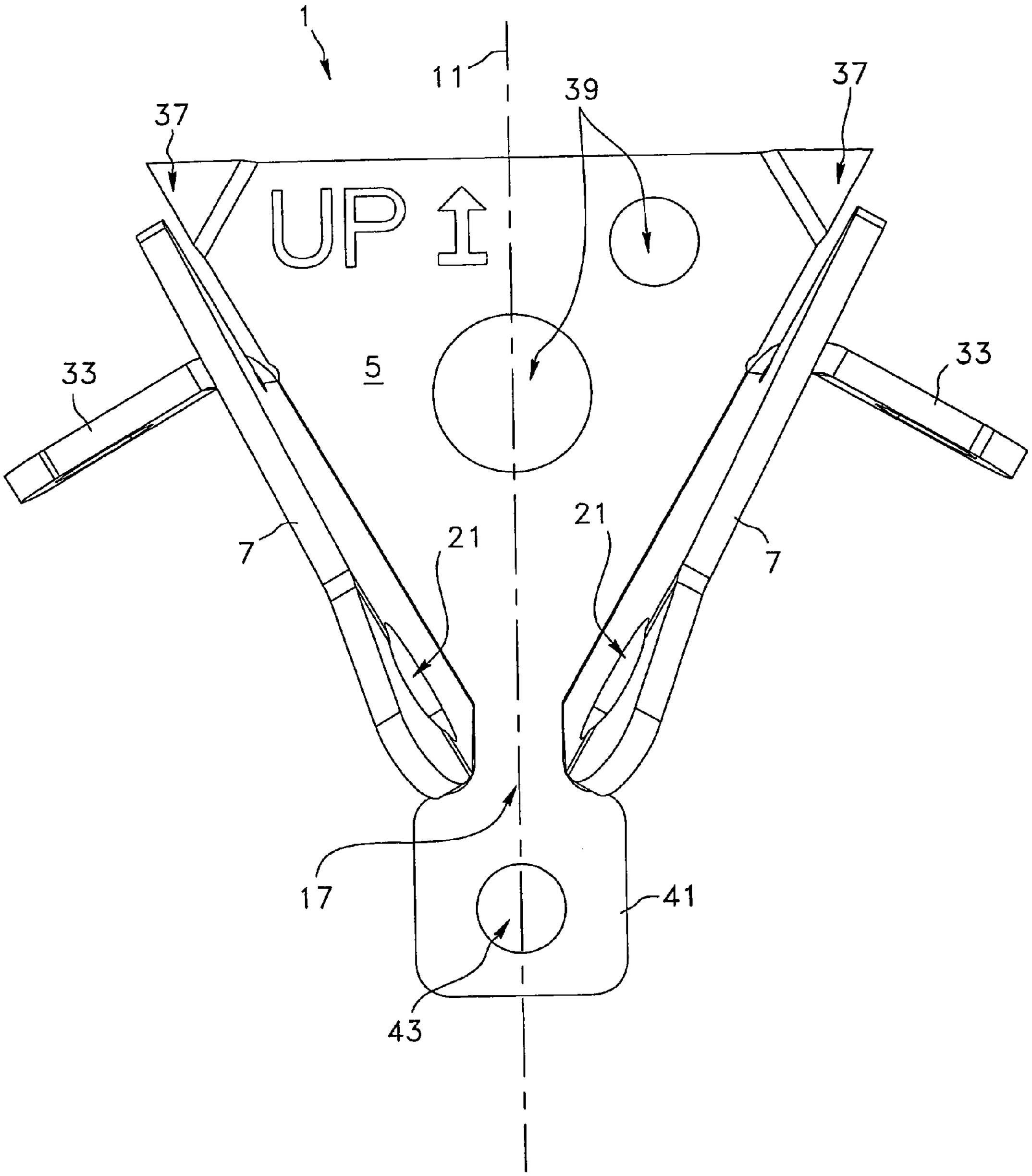
FIG. 5 is a front plan view of the chain keeper shown in FIG. 4.
Figure 6:
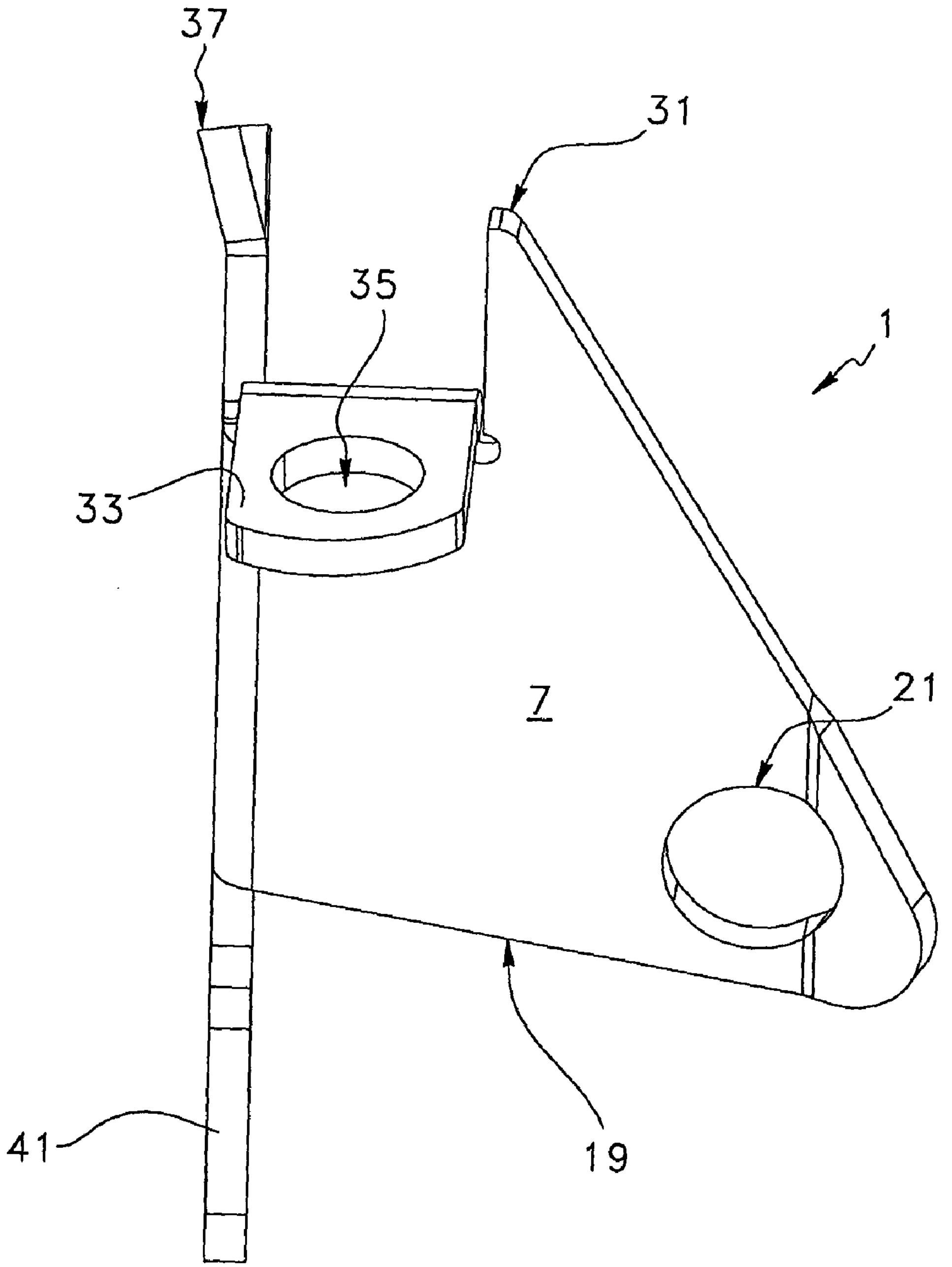
FIG. 6 is a side elevational view of the chain keeper shown in FIG. 4.

As better shown in FIGS. 4 and 5, the support bracket 5 of the chain keeper 1 preferably has left and right top corners 37, each of said top corners 37 being preferably provided with a prong for anchoring the support bracket 5 onto the fixed structure 9. Indeed, these prongs are preferably intended to "bite" into the fixed structure 9 for providing added security and stability to the support bracket 5 when it is mounted onto the fixed structure 9.

As also better shown in FIGS. 4 and 5, the support bracket 5 preferably comprises at least one hole 39 for receiving a fastener for securely mounting the support bracket 5 onto the fixed structure 9. As apparent to a person skilled in the art, a suitable number of fasteners with suitable mechanical properties should be used for the chain keeper 1, depending on the particular applications for which it is intended. Preferably also, one of said fasteners is located along the longitudinal axis 11 of the support bracket 5 for providing the chain keeper 1 with added stability, given the fact that the main loads acting onto the chain keeper 1 originate from the chain 3 which essentially acts substantially along the longitudinal axis 11 of the chain keeper 1, as better shown in FIG. 5.

Preferably also, the bottom section of the support bracket 5 comprises a fastening flange 41 and this fastening flange 41 preferably comprises at least one hole 43 for receiving a corresponding fastener for securely mounting the fastening flange 41 onto the fixed structure 9, and providing added security and stability for the chain keeper 1 mounted onto the fixed structure 9.

As better shown in FIGS. 4 and 5, the support bracket 5 is preferably triangular-shaped and has a pair of side edges, each plate 7 preferably extending along one of said side edges.

Preferably, the various components of the chain keeper 1, such as the support bracket 5, plates 7, support flanges 33, and/or fastening flange 41, are preferably made of one single piece and of a single material. Various manufacturing processes (welding, cutting and bending, casting, etc.) and various suitable corresponding materials may be used for fabricating the chain keeper 1 according to the present invention, as apparent to a person skilled in the art. Preferably, the chain keeper 1 is made of a suitable metallic material, although other suitable materials, such as composite materials, hardener polymers, etc., may be used depending on the particular applications for which the chain keeper 1 is intended, as also apparent to a person skilled in the art.

Figure 10:
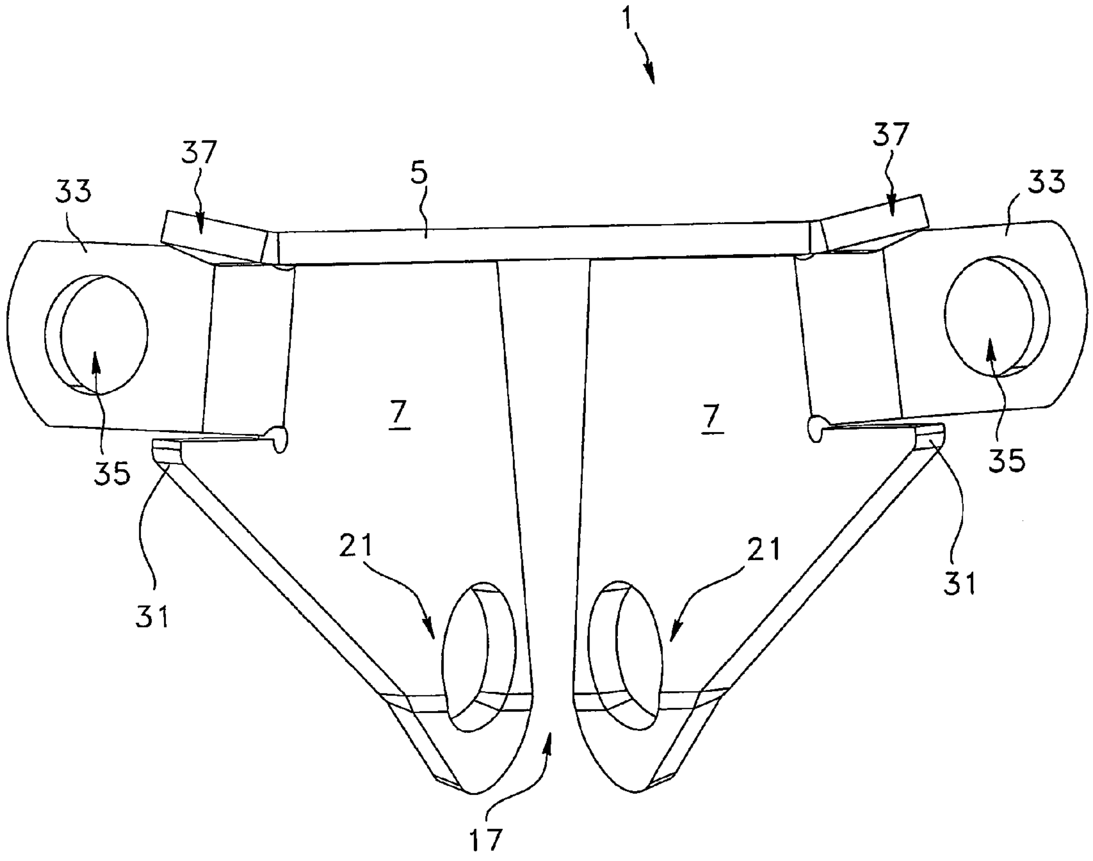
FIG. 10 is another top plan view of what is shown in FIG. 7 after the keeper has been subjected to an excessive load of the chain.

The chain keeper 1 is preferably devised to have substantially rigid components so as to provide a suitable retaining and securement of the chain 3, as apparent to a person skilled in the art. Moreover, the particular disposition of the plates 7 onto the support bracket 5, i.e. the slant of the plates 7 and the slot 17 defined thereinbetween, etc., is particularly advantageous in that, even after being subjected to an increased load from the chain 3 for example, the chain keeper 1 according to the present invention will provide an "increased" retaining of the chain 3 because the plates 7, as a result of the above-discussed, will tend to further converge towards one another, and further retain the segment of the chain 3, as can be easily understood when referring to FIG. 10, unlike the slit of a conventional chain keeper which would tend to adversely deform itself, by prying open for example.

The chain keeper 1 is preferably devised to have substantially rigid components so as to provide a suitable retaining and securement of the chain 3, as apparent to a person skilled in the art. Moreover, the particular disposition of the plates 7 onto the support bracket 5, i.e. the slant of the plates 7 and the slot 17 defined thereinbetween, etc., is particularly advantageous in that, even after being subjected to an increased load from the chain 3 for example, the chain keeper 1 according to the present invention will provide an "increased" retaining of the chain 3 because the plates 7, as a result of the above-discussed, will tend to further converge towards one another, and further retain the segment of the chain 3, as can be easily understood when referring to FIG. 10, unlike the slit of a conventional chain keeper which would tend to adversely deform itself, by prying open for example.

Moreover, the converging disposition of the plates 7 of the chain keeper 1 serves as a natural indication and orientation to a user of the keeper 1 as to where the chain 3 should be inserted, i.e. in the slot 17 defined between the converging peripheral edges 19 of the plates 7, and as to how the chain keeper 1 should be mounted onto a fixed structure 9. Alternatively, in order to avoid any ambiguity, the support bracket 5 of the chain keeper may be provided with a suitable indication for as to the proper orientation of the chain keeper 1 onto the fixed structure 9, such as with the expression "up" and a corresponding directional arrow for example, as better shown in FIGS. 4, 5, 8 and 9.

According to another aspect of the invention, there is also provided a method of retaining a chain 3 operatively connected to a driving mechanism of a chain hoist system. The method comprising the steps of a) providing a chain keeper 1 according to the present invention, such as the one described herein; and b) sliding a segment of the chain 3 into the slot 17 defined between the peripheral edges 19 of the plates 7 so as to retain the same from substantial vertical movement along the longitudinal axis 11 of the support bracket 5.

Preferably, the chain 3 comprises a portion hanging from the slot 17 of the chain keeper 1, and the method further comprises the step of c) engaging said portion of the chain 3 about one of the plates 7 of the chain keeper 1.

Preferably also, one of the plates 7 of the chain keeper 1 comprises a hook 31, and the method further comprises the step of d) hooking a link 27 of the portion of the chain 3 wrapped about one of the plates 7 onto said hook 31.

Preferably also, the bottom portion 13 of one of said plates 7 comprises a hole 21 for receiving a rod 23 of a padlock 25, and the method further comprises the step of e) securing said rod 23 of the padlock 25 onto the hole 21 so as to prevent the segment of the chain 3 to be removed from the slot 17 due to an impediment of the rod 23 secured onto said hole 21.

Alternatively, the bottom portion 13 of one of said plates 7 may comprise a hole 21 for receiving a rod 23 of a padlock 25, and the method after the above-mentioned step b) may simply comprise the step of c) securing said rod 23 of the padlock 25 onto the hole 21 so as to prevent the segment of the chain 3 to be removed from the slot 17 due to an impediment of the rod 23 secured onto said hole 21.

Preferably and as better shown in FIG. 3, the chain keeper 1 is simply attached by means of suitable fasteners onto a fixed structure 9, such as a wall or a post for example. When a person wants to secure the chain 3 of the hoist onto the keeper 1, all one has to do is insert the chain 3 in the slot 17 between the two angled plates 7 and make a loop around the support flanges 33 and/or the hooks 31 of the chain keeper 1, the hooks 31 being better illustrated in FIGS. 1 and 4. As can be easily understood, one can also do the same thing with a pair of chains 3 inserted between the plates 7. The slot 17 at the bottom of the keeper 1 is preferably substantially parallel, so that the chain 3 will slide in and out of the chain keeper 1 more easily. Two links 27 of the chain 3 are preferably hooked onto corresponding hooks 31 in order to stop the chain 3 from exiting the keeper 1, as better shown in FIGS. 3, 8 and 9. This preferably holds true even when the padlock 25 is not in the locking position. When a person wants to lock the chain keeper 1 to prevent anyone from opening the door, the person can simply pass the padlock 25 through the two holes 21 and lock it thereon, as better shown in FIGS. 3 and 8. According to the present invention, it is possible to retain and secure a single or a plurality of chains 3 in a wide variety of ways. The various holes of the keeper 1 can act as storage locations for the padlock 25, when the chain 3 is not locked, so as to avoid the padlock 25 from being misplaced when it is not in use. Another interesting feature of the chain keeper 1 is that the two top corners 37 are bent towards the surface of the fixed structure 9 for "biting" or anchoring into the fixed structure's and, namely, prevent the chain keeper 1 from rotating due to the cooperation with the chain 3 of the chain hoist system. The angle of the sheet metal with the ground preferably assures that the forces due to the chain pulling will be applied as close as possible to the wall, which makes the present chain keeper 1 very resistant. This configuration has several advantages, mainly due to its shape and components, which permit the chain keeper 1 to be strong without sacrificing the production cost.

As may now be appreciated, the present invention is an improvement and presents several advantages over other chain keepers 1 known in the prior art. Indeed, as briefly described herein, some of the advantages of this new design are the following: a) its faster way of inserting the padlock 25 onto the chain keeper assembly; b) the chain 3 is better secured in the chain keeper. 1; c) the keeper 1 resists to larger forces; and d) the forces are mostly applied onto the fixed structure's surface because of the shape of the keeper 1.

The chain keeper 1 according to the present invention is also safer than other models, because of its rounded edges and the small protrusion of the plates 7 which reduce the risk of someone been injured. Finally, the present chain keeper 1 is also a substantial improvement over the prior art in tat it improves the conventional chain keepers concerning the way to lock the chain 3 and the way people install the device.

As may now also be appreciated, the chain keeper of the present invention is a substantial improvement over the prior art in that, single chain 3 or a plurality of chains 3 may be retained by the keeper 1 and secured thereon with a padlock 25, in various different ways, the padlock 25 being very easily insertable into corresponding holes 21 of the bottom portion 15 of the plates 7. Moreover, the present invention is also advantageous in that the chain keeper 1 comprises safekeeping means for storing the padlock 25 when it is not being used, maintaining the padlock 25 out of the way of the work space (i.e. slot 17), when the latter is not being used, while keeping it readily available for an eventual use. Moreover, as can be easily understood, the present invention is also advantageous in that the position for the mounting hole 39 and of the bent corners 37 are preferably symmetrical, the latter feature preventing the rotation of the chain keeper 1. The present invention is also advantageous in that when the hand chain 3 is loaded, the angle of the components forces the band chain in the direction of the wall, thus increasing the security of the device by reducing the possibility of the chain 3 coming out of the slot 17.

Moreover, the present invention is also advantageous in that the resistance of the chain keeper 1 increases because the load is near to the wall, and thus the lever arm created is substantially small, and because of the slant of the plates 7, as discussed above.

Of course, numerous modifications could be made to the above-described embodiments without departing from the scope of the invention as defined in the appended claims.

What is claimed is:

1. A chain keeper for retaining a chain operatively connected to a driving mechanism of a chain hoist system, the chain keeper comprising:

a support bracket mountable onto a fixed structure, said support bracket having a substantially vertical longitudinal axis, and opposite top and bottom sections; and a pair of plates, each plate having top and bottom portions, the plates projecting from the support bracket and being slanted with respect to the longitudinal axis thereof, the plates converging towards one another towards the bottom section of the support bracket, a slot being defined between peripheral edges of the plates at said bottom section of the support bracket, said slot being shaped and sized to slidably and removably receive therein a segment of the chain for retaining the same from substantial vertical movement along the longitudinal axis of the support bracket;

wherein the bottom portion of each plate defines a hole for receiving a rod of a padlock and wherein the top portion of each plate comprises a hook for hooking thereon a corresponding link of the chain.

2. A chain keeper according to claim 1, wherein the bottom portion of one of said plates comprises a hole for receiving a rod of a padlock.

3. A chain keeper according to claim 1, wherein the top portion of one of said plates comprises a hole for receiving a rod of a padlock.

4. A chain keeper according to claim 1, wherein the top portion of one of said plates comprises a hook for hooking thereon a link of the chain.

5. A chain keeper according to claim 1, wherein the top portion of one of said plates is provided with a support flange.

6. A chain keeper according to claim 5, wherein the support flange comprising a hole for receiving a rod of a padlock.

7. A chain keeper according to claim 1, wherein the support bracket has left and right top corners, each of said top corners being provided with a prong for anchoring the support bracket onto the fixed structure.

8. A chain keeper according to claim 1, wherein the support bracket comprises at least one hole for receiving a fastener for securely mounting the support bracket onto the fixed structure.

9. A chain keeper according to claim 1, wherein the bottom section of the support bracket is provided with a fastening flange comprising at least one hole for receiving a fastener for securely mounting said fastening flange onto the fixed structure.

10. A chain keeper according to claim 1, wherein the support bracket is triangular-shaped and has a pair of side edges, and wherein each plate extends along one of said side edges.

11. A chain keeper according to claim 1, wherein the top portion of one of said plates is provided with a support flange comprising a hole for receiving a rod of a padlock.

12. A chain keeper according to claim 11, wherein the support bracket has left and right top corners, each of said top corners being provided with a prong for anchoring the support bracket onto the fixed structure; wherein the support bracket further comprises at least one hole for receiving a fastener for securely mounting the support bracket onto the fixed structure; and wherein the bottom section of the support bracket is provided with a fastening flange comprising at least one hole for receiving a fastener for securely mounting said fastening flange onto the fixed structure.

13. A chain keeper according to claim 12, wherein the support bracket is triangular-shaped and has a pair of side edges, and wherein each plate extends along one of said side edges.

14. A chain keeper according to claim 13, wherein the support bracket, plates, and flanges of the chain keeper are made of a single piece and of a single material.

* * * * *